No. 747,689. Patented December 22, 1903.

UNITED STATES PATENT OFFICE.

JOHN JOSEPH FEELY, OF WHITEPLAINS, NEW YORK, ASSIGNOR OF ONE-HALF TO JAMES O'CONNELL, OF NEW YORK, N. Y.

PROCESS OF TREATING LIME.

SPECIFICATION forming part of Letters Patent No. 747,689, dated December 22, 1903.

Application filed March 5, 1903. Serial No. 146,374. (No specimens.)

*To all whom it may concern:*

Be it known that I, JOHN JOSEPH FEELY, a citizen of the United States, and a resident of Whiteplains, in the county of Westchester and State of New York, have invented a new and Improved Process for the Treatment of Lime, of which the following is a full, clear, and exact description.

The great difficulties and objections encountered in the storage, transportation, and use of common quicklime are caused by its tendency to heat, slake, swell, and shrink. These changes frequently occur after the lime has been made up into mortar and mixed with plaster and placed upon walls and ceilings, in many cases causing the walls and ceilings to pit, crack, and chip off.

My invention has for its purpose the production and manufacture of lime which will eliminate or overcome the class of objections above set forth.

The invention consists in the novel steps of the process to be hereinafter fully set forth, and pointed out in the claims.

In practicing my invention common quicklime is first slaked to a granulated or powdered condition by a solution of acetic acid and water. This chemical solution is prepared by blending together the said acetic acid and water in about the proportions of thirty-two drams of acid and seven gallons of water, and in commingling these ingredients care must be taken not to make the solution any stronger chemically than here stated, as otherwise it will have a tendency to burn the lime. After the quicklime has been slaked to the above-mentioned granulated or powdered condition it is allowed to remain absolutely undisturbed for a period approximating twenty hours, in order to give the solution time to thoroughly impregnate the lime. After the lime has laid in the solution above mentioned for the stated period of time said lime is manipulated in any desired manner most convenient to expose it to the action of the air for a further period of four hours, at the end of which time the lime will be found to be dry, white, and highly carbonized. A thorough drying of the lime is thus obtained by the attrition generated in the manipulation of the slaked lime, assisted by the chemical properties of the solution, which act as a drier as well as a solvent. It should be thoroughly understood that no other quicklime or other substance is to be added to the lime originally intended to be prepared by this process—such, for example, as is often practiced of adding more quicklime to take up any moisture in order to dry the lime quickly. In fact, after the lime has been treated by the solution it does not require any extra quicklime to take up any moisture or assist in any manner to further its preparation. After the second period of four hours, making twenty-four hours in all, the lime being now white and dry, as the final step of my process it must be conveyed to a pulverizing-machine and there ground or pulverized to the desired fineness. The lime is now ready for use.

The article thus produced may be kept for an indefinite time without air-slaking, it will not slake, heat, swell, or change, it retains its setting qualities, is ready for use at any time, and may be applied to great advantage to any other purposes for which lime is commonly used, but especially in mortars and plasters.

Having thus described my invention, I claim as new and desire to secure by Letters Patent—

1. In the process of treating lime, slaking quicklime to a powdered or granulated condition by a chemical solution of acetic acid and water, as set forth.

2. The herein-described process of treating lime, which consists in slaking lime to a powdered or granulated condition in a chemical solution of acetic acid and water, and drying said lime by the action of attrition, assisted by the chemicals in said chemical solution, as described.

3. The herein-described process of treating lime, which consists in slaking lime to a powdered or granulated condition in a chemical solution of acetic acid and water, drying said lime by the action of attrition, assisted by the chemicals in said chemical solution, and finally in grinding said slaked and dried lime chemically prepared, to a still finer powdered form, as set forth.

In testimony whereof I have signed my name to this specification in the presence of two subscribing witnesses.

JOHN JOSEPH FEELY.

Witnesses:
WM. FREDERIC LAYTON,
JOHN J. NUGENT.